US008943751B2

United States Patent
Ivester et al.

(10) Patent No.: US 8,943,751 B2
(45) Date of Patent: Feb. 3, 2015

(54) LIFT ASSIST MECHANISM

(75) Inventors: Clarence Ivester, Arlington, WA (US);
Erik E. S. Nilsen, Mountlake Terrace, WA (US); Robert K. Brauer, Seattle, WA (US)

(73) Assignee: Be Intellectual Property, Inc., Wellington, FL (US)

( * ) Notice: Subject to any disclaimer, the term of this patent is extended or adjusted under 35 U.S.C. 154(b) by 732 days.

(21) Appl. No.: 13/089,248

(22) Filed: Apr. 18, 2011

(65) Prior Publication Data

US 2011/0253714 A1   Oct. 20, 2011

Related U.S. Application Data

(60) Provisional application No. 61/326,178, filed on Apr. 20, 2010.

(51) Int. Cl.
*E05F 1/10* (2006.01)
*B64D 11/00* (2006.01)
*F16F 9/56* (2006.01)

(52) U.S. Cl.
CPC ............ *B64D 11/003* (2013.01); *E05F 1/1091* (2013.01); *F16F 9/56* (2013.01); *E05Y 2900/502* (2013.01); *E05Y 2900/538* (2013.01)
USPC .......................................... 49/386; 244/118.5

(58) Field of Classification Search
USPC ............ 244/118.5, 118.1, 129.4; 49/386.387; 16/66, 81
See application file for complete search history.

(56) References Cited

U.S. PATENT DOCUMENTS

| 5,244,269 | A  | * | 9/1993  | Harriehausen et al. ........ 312/247 |
| 5,567,028 | A  | * | 10/1996 | Lutovsky et al. ............ 312/246 |
| 7,143,977 | B2 | * | 12/2006 | Graf et al. .................. 244/118.1 |
| 7,258,406 | B2 | * | 8/2007  | Stephan et al. ............... 312/246 |
| 7,481,397 | B2 | * | 1/2009  | Steinbeck et al. .......... 244/118.5 |
| 7,887,008 | B2 | * | 2/2011  | Lamoree et al. ........... 244/118.1 |
| 8,028,957 | B2 | * | 10/2011 | Wolf et al. ................. 244/118.5 |
| 2008/0078871 | A1 |  | 4/2008 | Munson et al. |

FOREIGN PATENT DOCUMENTS

EP    0731021 A1    9/1996

OTHER PUBLICATIONS

EPO, International Search Report and Written Opinion for International Application No. PCT/US2011/033127, dated Oct. 14, 2011.

* cited by examiner

*Primary Examiner* — Katherine Mitchell
*Assistant Examiner* — Catherine A Kelly
(74) *Attorney, Agent, or Firm* — Fulwider Patton LLP

(57) ABSTRACT

A lift assist mechanism is provided for assisting lifting of a movable component that can move between lowered and raised positions relative to a fixed structure. The lift assist mechanism includes a lift assist spring connected to a spring shaft, and an elongated track in which an end of the lift assist spring or an end of the spring shaft are movably engaged. A spring lock restrains movement of the spring shaft when a lift assist is not required, and releases the spring shaft when a lift assist is required.

16 Claims, 4 Drawing Sheets

LIFT ASSIST MECHANISM

CROSS-REFERENCES TO RELATED APPLICATIONS

This application is based upon and claims priority from Provisional Patent Application No. 61/326,178, filed Apr. 20, 2010, which is incorporated by reference in its entirety herein.

BACKGROUND OF THE INVENTION

The present invention generally relates to lift assist mechanisms, and more particularly relates to lift assist mechanisms for stowage containers or devices, such as for overhead luggage bins for aircraft.

While a powered stowage bin system is known that includes a powered stowage bin lift system, which unlatches the stowage bin and provides a powered lifting force controlled by a cabin management system, existing pivoting aircraft overhead stowage bins typically rely on force provided by an operator, such as a passenger or flight attendant, for example, to close and secure the stowage bin. Typically such pivoting aircraft overhead stowage bins have no operator assist mechanism. Springs or other simple mechanisms designed to assist in moving stowage containers or devices generally force users to pull downward on an empty or only lightly loaded container or device to lower the container or device. Simple assist mechanisms can also be ill suited to assisting with heavy loads, and can be totally unsuitable for extremely heavy loads.

It would be desirable to provide a lift assist mechanism that can be used with aircraft overhead stowage bins or other types of stowage containers or devices to provide improved ergonomics for use of stowage systems. It would also be desirable to provide a lift assist mechanism that can be used with aircraft overhead stowage bins or other types of stowage containers or devices, that can be retrofitted in combination with existing aircraft overhead stowage bins. The present invention meets these and other needs.

SUMMARY OF THE INVENTION

Briefly, and in general terms, the present invention provides for a lift assist mechanism that provides for improved ergonomics for use of a stowage container, such as aircraft overhead stowage bins or other types of stowage containers or devices, and that can be retrofitted in combination with existing aircraft overhead stowage bins.

Accordingly, the present invention provides for a lift assist mechanism for providing a lift assist to a movable component that can move between lowered and raised positions relative to a fixed structure. The lift assist mechanism includes a lift assist spring that is compressed when the movable component is in the lowered position and that is uncompressed when the movable component is in the raised position. The lift assist mechanism also includes a spring shaft having an end connected to and extending from the lift assist spring. The lift assist mechanism also includes an elongated track defined in one of the movable component and the fixed structure, with either the lift assist spring or the spring shaft movably engaged with the track for movement along the elongated track. In one presently preferred aspect, the lift assist spring can be a gas spring. In another presently preferred aspect, the lift assist spring can be a mechanical spring. A spring lock having a latched configuration and an unlatched configuration is connected to the lift assist spring. The spring lock is configured to restrain movement of the spring shaft in the latched configuration when a lift assist of the movable component is not required, and to release the spring shaft in the unlatched configuration when a lift assist of the movable component is required.

In a presently preferred aspect, the movable component can be a stowage container, and a switch is operatively connected to the spring lock to retain the spring lock in the unlatched configuration as the stowage container is lifted from lowered position to the raised position. In another presently preferred aspect, a time delay mechanism is provided to retain the spring lock in the unlatched configuration as the stowage container is lifted from lowered position to the raised position.

In another presently preferred aspect, the spring lock includes a locking pawl configured to releasably engage the spring shaft, a solenoid connected to the locking pawl to cause the locking pawl to latch and restrain movement of the spring shaft when a lift assist of the movable component is not required, and to cause the locking pawl to unlatch and release the spring shaft for movement of the spring shaft when the lift assist is required. A spring shaft collar is disposed on the spring shaft, and is loaded against the locking pawl engaged with the spring shaft to prevent the solenoid from unlatching the mechanism when the movable component is in the raised position and a lift assist of the movable component is not required. The spring shaft collar is pushed away from the locking pawl by the lift assist spring when the movable component is in the lowered position and a lift assist of the movable component is required, allowing the locking pawl to be disengaged from the spring shaft by the solenoid. In another presently preferred aspect, when the movable component is a stowage bin portion cooperatively connected to a stationary bin support structure for movement of the stowage bin portion between lowered and raised positions relative to the stationary support structure, a switch with an electrical connection to receive electrical power from an aircraft electrical system is provided for operation of the solenoid.

In another presently preferred aspect, the lift assist mechanism can include a latch motion dampening mechanism releasably connectable with the second end of the spring shaft. The latch motion dampening mechanism can include a spring shaft collar on the second end of the spring shaft, and an overcentering lock pawl releasably connectable with the spring shaft collar on the second end of the spring shaft. A rocker arm including a first end and a second end is rotatably mounted to the lift assist spring for movement between a first position and a second position, with the second end of the rocker arm being disposed adjacent to the spring shaft collar on the second end of the spring shaft, a buffered return spring connected to the rocker arm, and an overcenter spring connected between the first end of the rocker arm and the overcentering lock pawl. The buffered return spring biases the rocker arm and overcenter spring to cause the overcentering lock pawl into engagement with the spring shaft collar on the spring shaft when the overcentering lock pawl is in a latched configuration, and the spring shaft collar biases the rocker arm and overcenter spring to cause the overcentering lock pawl to move out of engagement with the spring shaft collar on spring shaft when the overcentering lock pawl is in an unlatched configuration. In a presently preferred aspect, the buffered return spring is configured to delay engagement of the overcentering lock pawl as the rocker rotates under pressure from the buffered return spring.

These and other aspects and advantages of the invention will become apparent from the following detailed description

DETAILED DESCRIPTION OF THE PREFERRED EMBODIMENTS

Figure 1:
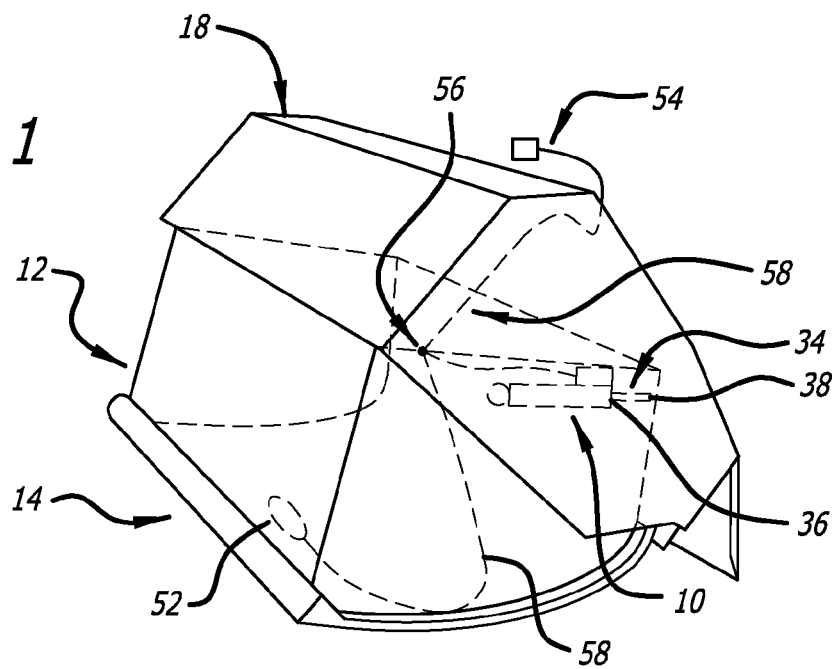
FIG. 1 is a perspective view of an overhead stowage bin module in an open position including a lift assist mechanism according to the present invention.

Referring to the drawings, which are provided by way of example, and not by way of limitation, the present invention provides for a lift assist mechanism 10 for providing a lift assist to a movable component 12 that can move between a lowered position 14 and a raised position 16 relative to a fixed structure 18. In a presently preferred aspect, the movable component can be a stowage bin portion cooperatively connected to the fixed structure, which can be a stationary bin support structure, so that the stowage bin portion can move between the lowered and raised positions relative to the stationary bin support structure. The assist mechanism can provide an assist to lifting the stowage bin, but will not close the bin by itself. This system as designed is an on demand or as needed type of system that is enabled when contents are loaded into the stowage bin or other movable component.

Figure 2:
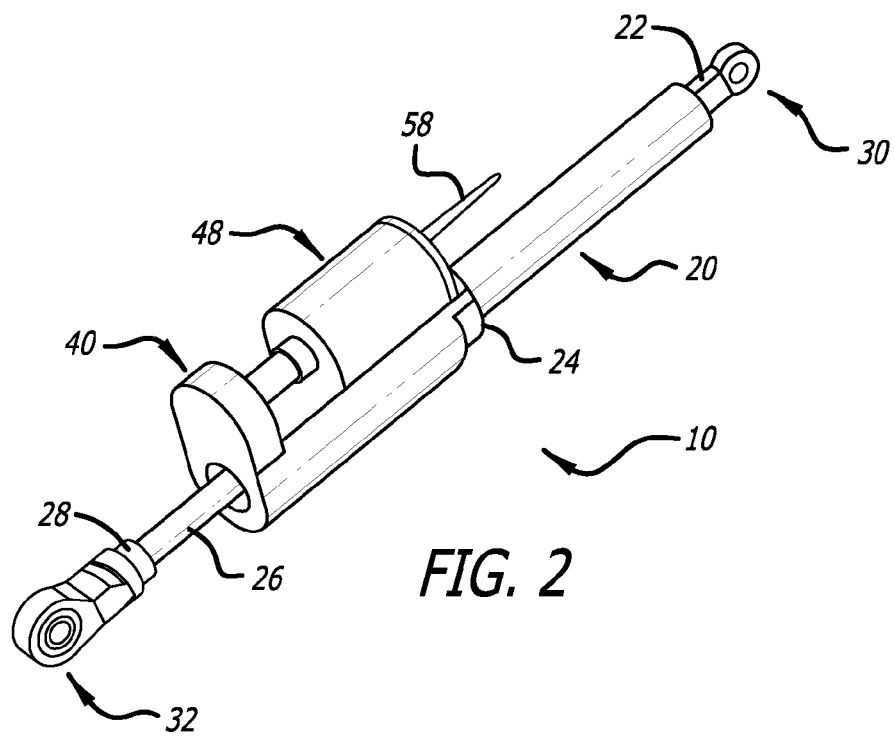
FIG. 2 is an enlarged perspective view of a lift assist mechanism according to the present invention.

As is illustrated in FIGS. 1 and 2, the lift assist mechanism includes a lift assist spring 20 having a first end 22 and a second end 24. The lift assist spring is compressed when the movable component is in the lowered position and uncompressed when the movable component is in the raised position. A spring shaft or rod 26 is connected to and extends from the second end of the lift assist spring, and has a first spring shaft end (not shown) and a second spring shaft end 28. The first end of the lift assist spring can include an end bearing 30, and the second spring shaft end 23 can include an end bearing 32. The lift assist spring can be a gas spring or a mechanical spring, for example. An elongated track 34 having a first end 36 and a second end 38 is defined in the movable component or the fixed structure, and either the first end of the lift assist spring or the second end of the spring shaft is movably engaged with the track for movement between the first and second ends of the elongated track.

Figure 3:
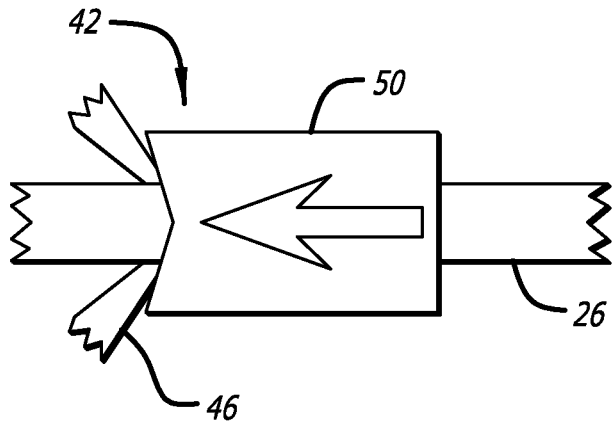
FIG. 3 is a schematic diagram illustrating latching of the lift assist spring lock.
Figure 4:
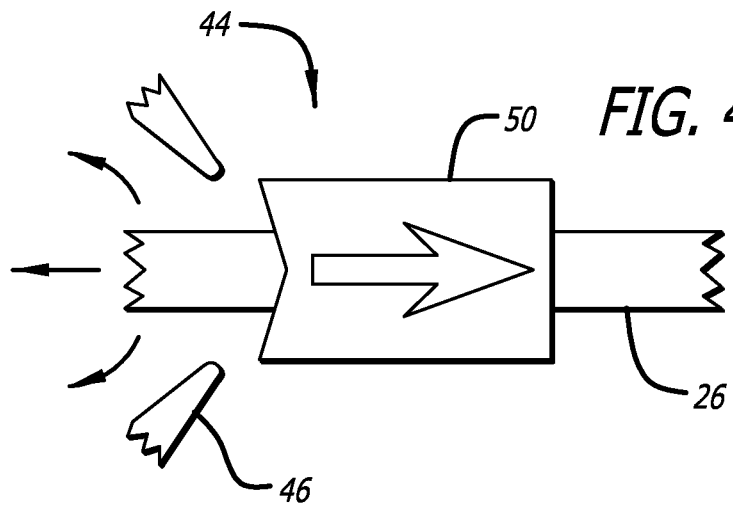
FIG. 4 is a schematic diagram illustrating unlatching of the lift assist spring lock.

Referring to FIGS. 3 and 4, a spring lock 40 is connected to the second end of the lift assist spring. The spring lock has a latched configuration 42 and an unlatched configuration 44, and the spring lock is configured to restrain movement of the spring shaft in the latched configuration when a lift assist of the movable component is not required, and to release the spring shaft in the unlatched configuration when a lift assist of the movable component is required. When the stowage bin or other movable component is unloaded, the lift assist spring is restrained by the spring lock.

Referring to FIGS. 2-4, in one presently preferred aspect, the spring lock is a solenoid operated spring lock, including a locking pawl 46 configured to releasably engage the spring shaft. A solenoid 48 is connected to the locking pawl and is configured to cause the locking pawl to latch and restrain movement of the spring shaft when a lift assist of the movable component is not required, and to cause the locking pawl to unlatch and release the spring shaft for movement of the spring shaft when the lift assist is required. A spring shaft collar 50 is disposed on the spring shaft, and the spring shaft collar is loaded against the locking pawl engaged with the spring shaft to prevent the solenoid from unlatching the mechanism when the movable component is in the raised position and a lift assist of the movable component is not required. The spring shaft collar is pushed away from the locking pawl by the lift assist spring when the movable component is in the lowered position and a lift assist of the movable component is required, allowing the locking pawl to be disengaged from the spring shaft by the solenoid.

As is shown in FIGS. 1 and 5-7, a switch 52 is connected to the solenoid for controlling operation of the solenoid, and can be mounted to the movable component or the fixed structure, for example. Referring to FIG. 1, an electrical connection 54 to the switch is provided to receive electrical power from an aircraft electrical system (not shown) for operation of the solenoid. The electrical power is transmitted to the switch through one or more contact points 56 that can be located at any location on the stowage bin, via wiring 58 providing electrical connections between various components of the system, and that will provide power to the system when the bin or other movable component is in the lowered or open position. When contents are loaded into the bin or other movable component, the switch can be used to activate the assist. When the stowage bin has no contents, the assist will be locked out to prevent the bin from self-closure. It is not necessary to use the assist to close the stowage bin; the bin is fully operable without using the assist.

Figure 5:
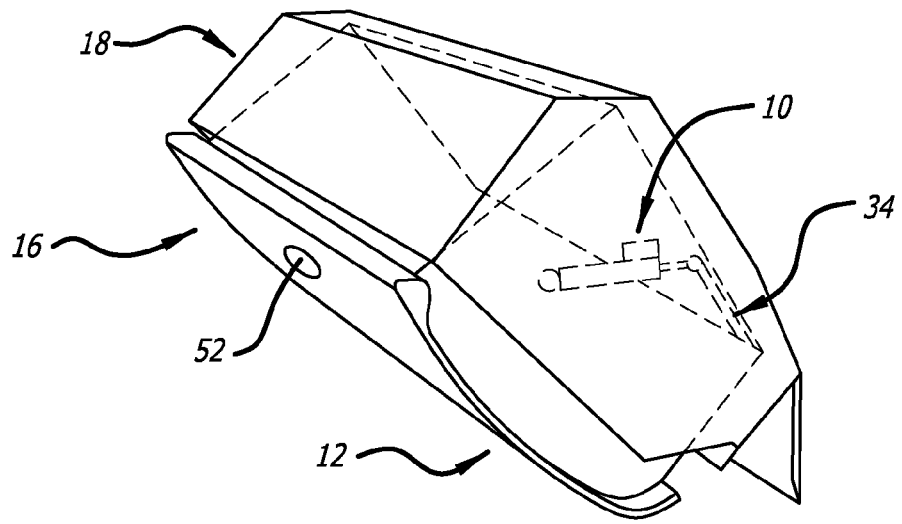
FIG. 5 is a schematic diagram illustrating a stowage bin incorporating the lift assist mechanism of FIG. 2, with the stowage bin shown in a raised, closed position.
Figure 6:
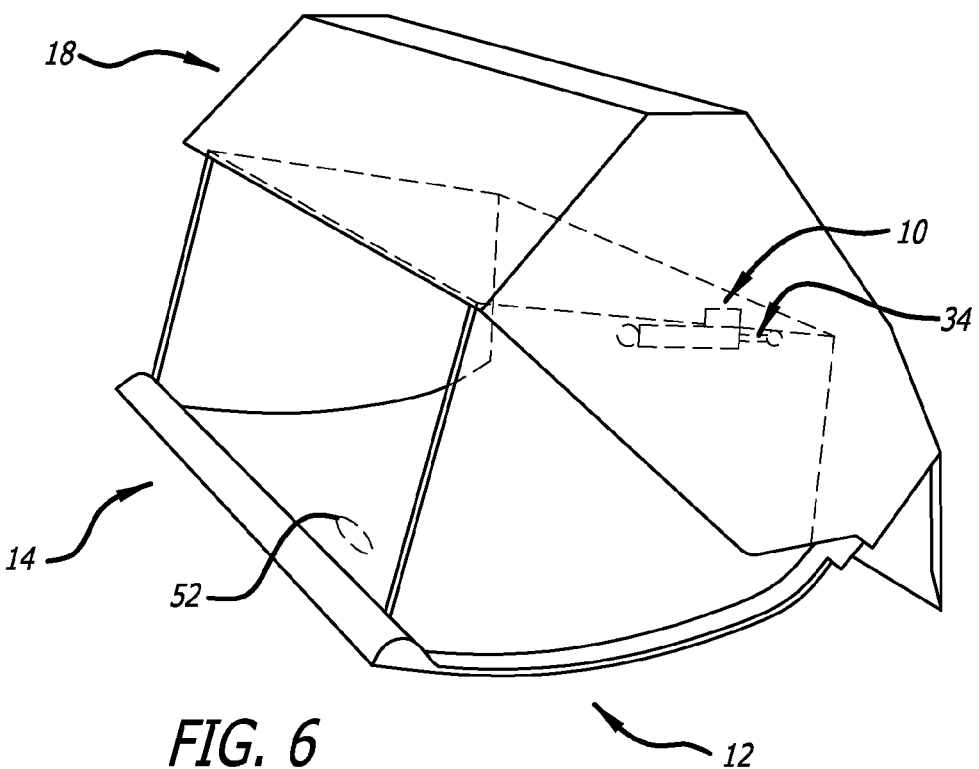
FIG. 6 is a schematic diagram illustrating the stowage bin incorporating the lift assist mechanism of FIG. 2, with the stowage bin shown in a lowered, open position.
Figure 7:
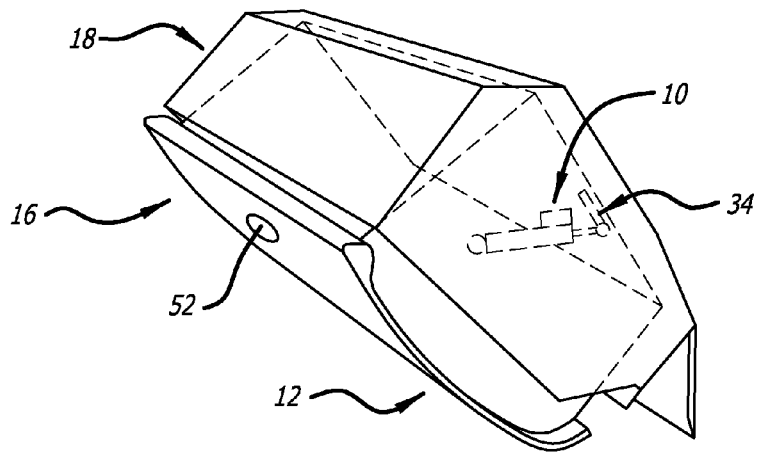
FIG. 7 is a schematic diagram illustrating a stowage bin incorporating the lift assist mechanism of FIG. 2, with the stowage bin shown in a raised, closed position, showing an alternate placement of the track for the lift assist mechanism.

Referring to FIG. 5, when the stowage bin or other movable component is in the raised or closed position, the lift assist is not engaged. The lift assist mechanism is secured to the stowage bin support structure and to the track that is attached to the stowage bin. The assist mechanism is shown in its compressed state providing no assist. Referring to FIG. 6, when the stowage bin or other movable component is moved to the lowered or open position, the lift assist mechanism slides along the track until it stops at the end of the track. This acts as a "soft" stop for an empty stowage bin. Loading contents into the stowage bin will further compress the spring in the assist mechanism, and will release the spring lock that allows the assist to be activated with switch. Referring to FIG. 7, the stowage bin or other movable component can be closed with a lift assist, such as when items are loaded into the stowage bin or other movable component, and the lift assist spring mechanism is compressed past its empty-weight position. Activating the switch 52 disengages the mechanism lock, and allows the spring to fully assist the stowage bin to its closed position.

Figures 8A, 8B, 8C:
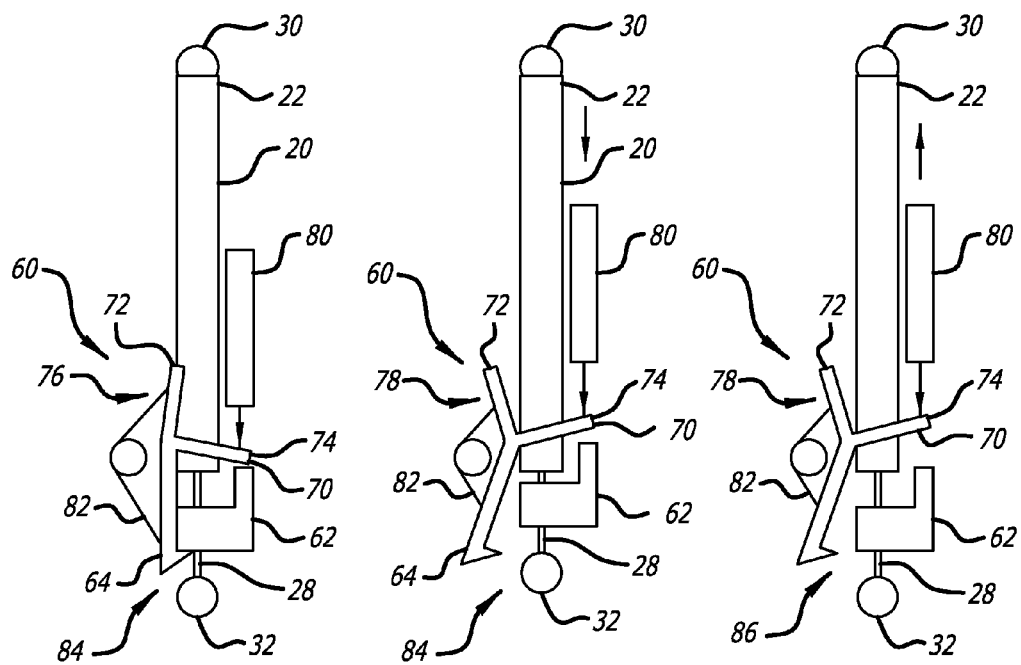
FIG. 8A is a schematic diagram illustrating operation of a latch release latch motion dampening mechanism, showing the lift assist mechanism in a latched configuration.
FIG. 8B is a schematic diagram illustrating operation of the latch release latch motion dampening mechanism of FIG. 8A, showing the lift assist mechanism in an unlatched configuration, operating under full load.
FIG. 8C is a schematic diagram illustrating operation of the latch release latch motion dampening mechanism of FIG. 8A, showing the lift assist mechanism in an unlatched configuration, operating for a quick lift.

Referring to FIGS. 8A-8C, in another presently preferred aspect, the spring lock may be a mechanically operating latch motion dampening mechanism 60 that is releasably connectable with the second end of the spring shaft. A spring shaft collar 62 is provided on the second end of the spring shaft, and an overcentering lock pawl 64 is releasably connectable with the spring shaft collar on the second end of the spring shaft. A rocker arm 70 has a first end 72 and a second end 74, and the rocker arm is rotatably mounted to the second end of the lift assist spring for movement between a first position 76 and a second position 78. The second end of the rocker arm is preferably disposed adjacent to the spring shaft collar on the second end of the spring shaft. A buffered return spring 80 is connected to the rocker arm, and an overcenter spring 82 is connected between the first end of the rocker arm and the overcentering lock pawl. The buffered return spring biases the rocker arm and overcenter spring to cause the overcentering lock pawl into engagement with the spring shaft collar on the spring shaft when the overcentering lock pawl is in a latched configuration 84, and the spring shaft collar biases the rocker and overcenter spring to cause the overcentering lock pawl to move out of engagement with the spring shaft collar on spring shaft when the overcentering lock pawl is in an unlatched configuration 86. The buffered return spring is preferably configured to delay engagement of the overcentering lock pawl as the rocker arm rotates under pressure from the buffered return spring. Referring to FIG. 8A, illustrating a slow release from a latched configuration, the buffered return spring pushes the rocker arm clockwise, and the overcentering lock pawl is urged into engagement with the spring shaft collar on the spring shaft. Referring to FIG. 8B, illustrating a full loading of the lift assist mechanism in the unlatched configuration, the spring shaft collar pushes the rocker arm counterclockwise, and the overcentering lock pawl is urged out of engagement with the spring shaft collar. Referring to FIG. 8C, illustrating a quick lift from an unlatched configuration, the buffered return spring can delay engagement of the overcentering lock pawl as the rocker arm rotates under pressure from buffered return spring.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A lift assist mechanism for providing a lift assist to a movable component that can move between lowered and raised positions relative to a fixed structure, comprising:
   a lift assist spring having a first end and a second end, said lift assist spring being compressed when the movable component is in the lowered position and uncompressed when the movable component is in the raised position;
   a spring shaft having a first end connected to and extending from said second end of said lift assist spring, and a second end;
   an elongated track defined in one of the movable component and the fixed structure, said elongated track having first and second ends, and wherein one of said first end of the lift assist spring and said second end of the spring shaft is movably engaged with said track for movement between said first and second ends of said elongated track; and
   a spring lock connected to said second end of said lift assist spring, said spring lock having a latched configuration and an unlatched configuration, said spring lock being configured to restrain movement of the spring shaft in said latched configuration when a lift assist of the movable component is not required and to release the spring shaft in said unlatched configuration when a lift assist of the movable component is required, said spring lock including a locking pawl configured to releasably engage said spring shaft, a solenoid connected to said locking pawl and configured to cause said locking pawl to latch and restrain movement of the spring shaft when a lift assist of the movable component is not required and to cause said locking pawl to unlatch and release said spring shaft for movement of the spring shaft when the lift assist is required, and a spring shaft collar disposed on the spring shaft, said spring shaft collar being loaded against the locking pawl engaged with the spring shaft to prevent the solenoid from unlatching said mechanism when the movable component is in the raised position and a lift assist of the movable component is not required, and the spring shaft collar being pushed away from the locking pawl by the lift assist spring when the movable component is in the lowered position and a lift assist of the movable component is required, allowing the locking pawl to be disengaged from the spring shaft by the solenoid.

2. The lift assist mechanism of claim 1, wherein the movable component comprises a stowage container, and further comprising a switch configured to retain said spring lock in said unlatched configuration as the stowage container is lifted from lowered position to the raised position.

3. The lift assist mechanism of claim 1, wherein the movable component comprises a stowage container, and further comprising a time delay mechanism to retain said spring lock in said unlatched configuration as the stowage container is lifted from lowered position to the raised position.

4. The lift assist mechanism of claim 1, wherein said first end of said lift assist spring comprises an end bearing.

5. The lift assist mechanism of claim 1, wherein said second end of said spring shaft comprises an end bearing.

6. The lift assist mechanism of claim 1, wherein said lift assist spring comprises a gas spring.

7. The lift assist mechanism of claim 1, wherein said lift assist spring comprises a mechanical spring.

8. The lift assist mechanism of claim 1, wherein said movable component comprises a stowage bin portion cooperatively connected to a stationary bin support structure for movement of said stowage bin portion between said lowered and raised positions relative to said stationary support structure, and further comprising:
   a switch configured operate the solenoid;
   an electrical connection configured to receive electrical power from an aircraft electrical system, and wherein said switch is configured to receive the electrical power from the electrical connection for operation of said solenoid.

9. A lift assist mechanism for providing a lift assist to a stowage bin portion that can move between lowered and raised positions relative to a stationary bin support structure, comprising:
   a lift assist spring having a first end and a second end, said lift assist spring being compressed when the stowage bin portion is in the lowered position and uncompressed when the stowage bin portion is in the raised position;

a spring shaft having a first end connected to and extending from said second end of said lift assist spring, and a second end;

an elongated track defined in one of the stowage bin portion and the stationary bin support structure, said elongated track having first and second ends, and wherein one of said first end of the lift assist spring and said second end of the spring shaft is movably engaged with said track for movement between said first and second ends of said elongated track; and a spring lock connected to said second end of said lift assist spring, said spring lock having a latched configuration and an unlatched configuration, said spring lock being configured to restrain movement of the spring shaft in said latched configuration when a lift assist of the stowage bin portion is not required and to release the spring shaft in said unlatched configuration when a lift assist of the stowage bin portion is required, said spring lock including a locking pawl configured to releasably engage said spring shaft, a solenoid connected to said locking pawl and configured to cause said locking pawl to latch and restrain movement of the spring shaft when a lift assist of the stowage bin portion is not required and to cause said locking pawl to unlatch and release said spring shaft for movement of the spring shaft when the lift assist is required, and a spring shaft collar disposed on the spring shaft, said spring shaft collar being loaded against the locking pawl engaged with the spring shaft to prevent the solenoid from unlatching said mechanism when the stowage bin portion is in the raised position and a lift assist of the stowage bin portion is not required, and the spring shaft collar being pushed away from the locking pawl by the lift assist spring when the stowage bin portion is in the lowered position and a lift assist of the stowage bin portion is required, allowing the locking pawl to be disengaged from the spring shaft by the solenoid.

10. The lift assist mechanism of claim 9, further comprising a switch configured to retain said spring lock in said unlatched configuration as the stowage container is lifted from lowered position to the raised position.

11. The lift assist mechanism of claim 9, further comprising a time delay mechanism to retain said spring lock in said unlatched configuration as the stowage container is lifted from lowered position to the raised position.

12. The lift assist mechanism of claim 9, wherein said first end of said lift assist spring comprises an end bearing.

13. The lift assist mechanism of claim 9, wherein said second end of said spring shaft comprises an end bearing.

14. The lift assist mechanism of claim 9, wherein said lift assist spring comprises a gas spring.

15. The lift assist mechanism of claim 9, wherein said lift assist spring comprises a mechanical spring.

16. The lift assist mechanism of claim 9, wherein said stowage bin portion is cooperatively connected to said stationary bin support structure for movement of said stowage bin portion relative to said stationary support structure, said stowage bin portion being movable between said lowered and raised positions, and further comprising:
 a switch configured operate the solenoid;
 an electrical connection configured to receive electrical power from an aircraft electrical system, and wherein said switch is configured to receive the electrical power from the electrical connection for operation of said solenoid.

* * * * *